United States Patent [19]

Bowlds

[11] Patent Number: 4,651,319
[45] Date of Patent: Mar. 17, 1987

[54] MULTIPLEXING ARRANGEMENT WITH FAST FRAMING

[75] Inventor: Harvey F. Bowlds, Owensboro, Ky.

[73] Assignee: Motorola, Inc., Schaumburg, Ill.

[21] Appl. No.: 786,491

[22] Filed: Oct. 11, 1985

[51] Int. Cl.$^4$ ................................................ H04J 3/02
[52] U.S. Cl. ...................................... 370/112; 370/100
[58] Field of Search ......................... 370/100, 112, 99; 307/243, 244; 328/104, 105

[56] References Cited

U.S. PATENT DOCUMENTS 4,445,215  4/1984  Svendsen ............................. 370/112
4,466,097  8/1984  Nose ..................................... 370/112

Primary Examiner—Douglas W. Olms
Attorney, Agent, or Firm—Melvin A. Schechtman; Donald B. Southard

[57] ABSTRACT

A multiplexing arrangement is described for use in a digital communications system, in which it is desired to multiplex plural user data inputs into a single serial digital communications channel and then to decode the data to the appropriate user data outputs. The arrangement contemplates the transmission of data in blocks of $n^2$ bits, and provides framing in the form of a frame alignment word having the value of F for n bits, followed by n−1 subsequences each of n bits duration and each initiated by a framing bit having the value of F-bar, with the last subsequence terminating with a framing bit having the value of F-bar. The implementation is simple and provides rapid acquisition of the framing. In principle, the framing is error free in not being affected by the values assigned to the data.

5 Claims, 8 Drawing Figures

BASIC FRAMING FORMAT

FRAME LENGTH = 64 BITS
NO. OF OVERHEAD BITS = 16
NO. OF USER (U) BITS = 48

FIG. 5B TRUTH TABLE

| (WD) WRITE DISABLE | (R) RESET | ADDRESSED LATCH | OTHER 6 LATCHES | |
|---|---|---|---|---|
| 0 | 0 | D | NO CHANGE | WRITE DATA TO ADDRESSED LATCH |
| 0 | 1 | D | 0 | |
| 1 | 0 | NO CHANGE | NO CHANGE | |
| 1 | 1 | 0 | 0 | |

MULTIPLEXING ARRANGEMENT WITH FAST FRAMING

FIELD OF THE INVENTION

The present invention relates to digital communications in which it is desired to multiplex synchronous digital data available from multiple user data inputs into a single serial format, and then decode the data for delivery to multipler user data outputs. The invention relates more particularly to a method of framing data which may be simply implemented.

PRIOR ART

The invention deals with a method of framing data obtained from multiple user data inputs multiplexed into a single serial format that can be readily decoded (demultiplexed) without error in addressing the user data inputs to the correct user data output.

The present approach has been called block coding, in that the bits (data and framing) while sent in serial sequences, may be subdivided into subsequences of equal length, which in turn may be regarded as matrices or "blocks", if the sequences are regrouped. In the regrouping, which is similar to the ordering of letters and words making up lines, and to the ordering of lines making up a page. "Framing" is required to distinguish the beginning and the ending of the individual frames (i.e. blocks), the positions within each frame (or block) being dedicated to the same user input and user output. "Framing" is the customary means for achieving a fixed reference for addressing the various user data points, in a serial transmission of what is typically a rarely interrupted succession of bits, and occurring at the clocking rate.

To be successful framing should leave no ambiguity as to the beginning and the ending of the frame, irrespective of the data being transmitted. The framing should be efficient in requiring a minimum of the transmission period for a given quantity of data, and it should permit a simple implementation.

OBJECTS OF THE INVENTION

Accordingly, it is an object of the invention to provide in a multiplexing arrangement improved means for achieving fast framing.

It is still another object of the invention to provide in a multiplexing arrangement, framing means which are efficient in their use of framing bits in relation to data bits.

It is a further object of the invention to provide in a multiplexing arrangement, framing which is simple and easily implemented with conventional components.

These and other objects of the invention are achieved in an arrangement for multiplexing synchronous digital input data available in a parallel format to a serial format for transmission over a communications channel, and for demultiplexing the serial data at the output of the communications channel into the parallel format.

The inventive combination comprises ($n^2-2n$) input terminals for synchronous parallel user data, multiplexing means to which said parallel data is applied for formatting into a serial sequence of $n^2$ bits, said bits and sequences succeeding one another at regular clocking intervals and demultiplexing the serial data for distribution to ($n^2-2n$) addresses.

In accordance with the invention, the multiplexing means comprises formatting means providing n like digital framing bits (F) forming a frame alignment word (FAW) forming a first subsequence and defining the beginning of the sequence. The frame alignment word is followed by $n-1$ subsequences of equal length in which the first bit is an inverted framing bit (F-bar) followed by ($n-1$) bits of data, the last ($n^{th}$) subsequence being initiated and terminated by an inverted framing bit (F-bar) and including $n-2$ bits of data between the framing bits.

The demultiplexing means comprises a column selection address latch, and ($n-1$) row selection address latches, each row selection address latch having plural addresses.

The multiplexing means further comprises means responsive to the framing bits to synchronize the latches with the incoming data so as to properly address the selected data outputs to said data inputs. The arrangement provides a simple means for detecting the frame alignment word, and the final bit, and for responding to a fault if it occurs in these elements of the framing.

BRIEF DESCRIPTION OF THE DRAWINGS

The novel and distinctive features of the invention are set forth in the claims of the present application. The invention itself, however, together with further objects and advantages thereof, may best be understood by reference to the following description and accompanying drawings in which:

FIGS. 5A, 5B, 5C and 5D are detailed descriptions of the row address latches of FIG. 4, FIG. 5A and 5D providing the hardware implementation; FIG. 5B the truth table, and FIG. 5C the explanatory wave forms.

DESCRIPTION OF THE PREFERRED EMBODIMENT

Figure 1:
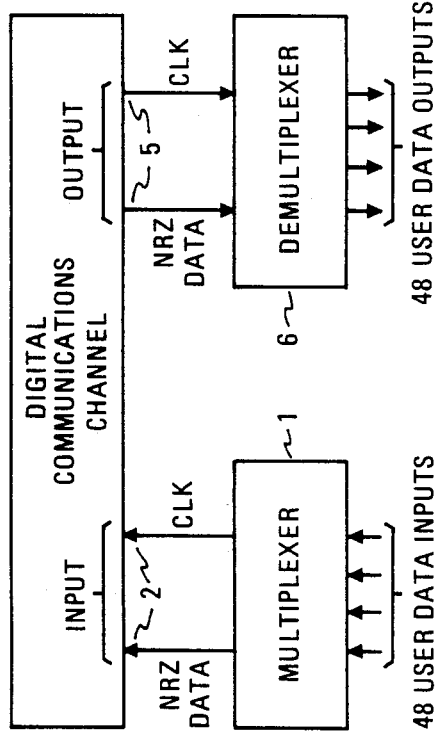
FIG. 1 is an illustration of portions of a digital communications system for digital information in which fast framing for multiplexed data in accordance with the invention may be applied.

FIG. 1 illustrates the portions of a digital communications system in which applicant's fast framing format is applied. The transmitting portion of the system may be seen to comprise a multiplexer 1 to which multiplex user data inputs are supplied, a digital communications system having an input 2 for NRZ data and clock, and conveying data and clock to a remote output 5.

The local signal, in the example under consideration, consists of 48 user data inputs, which are coupled to the multiplexer 1 where the 48 user dta inputs, typically referred to as being in parallel, are converted to a single data stream.

The "48" user data inputs are typically independent, but may also be interrelated. When used for fault detection, a single digital "1" may be used to symbolize a "no fault" condition in the equipment being monitored, and the zero may be used to symbolize a "fault" condition. In this case, each input may be independent. In another case, a numerical value may be desired and a succession of bits may be assigned to that function.

The data from "48" fault sensors is formated into a single block or frame in the multiplexer, and the data supplied is continuously refreshed. After a first frame has been transmitted from all 48 user data inputs, a second frame is transmitted using refreshed data from all 48 inputs. The frames then succeed one another in a continuous manner. In the preferred embodiment, it is important that each data input have an address to properly allocate the fault datum to the proper location at the receiver site. The data ordinarily changes at a slow rate in relation to the rate of data refreshment and in this usage the time and order of receipt provides adequate means for distinguishing between successive frames.

The data and clock are conveyed via the digital communications channel to a remote location. The output of the channel contains a single data stream of digital data and a clock to which it is synchronized which must now be applied to the demultiplexer 6 for "decoding" the signal. That is to say, the multiplexed signal must now be separated into 48 individual signals. These separate signals must then be addressed to the 48 appropriate locations.

Figure 2:
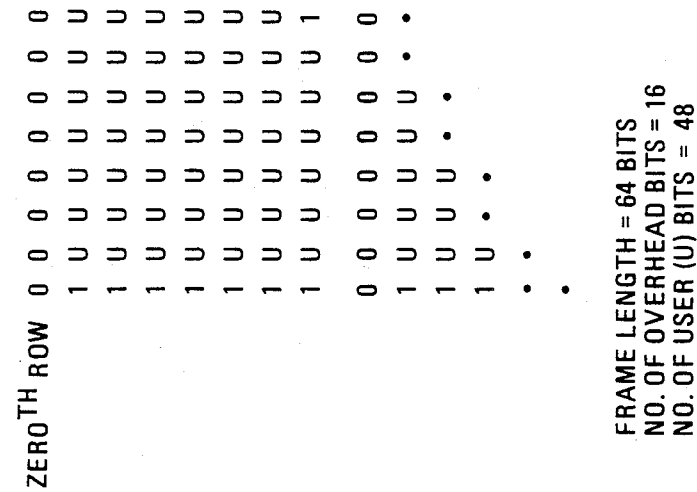
FIG. 2 is an illustration of the framing format of the present invention arranged in a square matrix format.

FIG. 2 illustrates the framing format employed in the preferred embodiment. For convenience in illustration, the format is illustrated as a square matrix in which each matrix is a frame of 64 bits and in which each frame is followed by another frame of 64 bits and so on, ad infinitum. In the usual transmission pattern the frames follow one another in an uninterrupted succession. FIG. 2 illustrates the incomplete frame as being spaced slightly below the complete frame. In the actual transmission process, both frames are transmitted in succession at the clocking intervals, and so would be at equal timing intervals. Within each frame the bits are transmitted in the customary order that one reads a printed page. The first (horizontal) row at the top is read from left to right, the second row from the top is read from left to right, and so on through eight rows. In actual transmission, the 64 bits illustrated in each frame are transmitted in the reading sequence just described and the second frame follows the first in the same sequence.

FIG. 2 illustrates the framing format. It illustrates the number of overhead bits which are necessary to allow the multiplexing/demultiplexing function to take place for unambiguous data input addresses. The framing allows the receiver to search through a data stream in the serial format and to recognize the first row of the frame, and the first element of each row, the last element of the last row, and thereby the beginning and the end of each frame or block of data. The recognition of these elements which permits the allocation of proper data inputs to data output is termed, "acquisition of framing". The process of scanning a single serial data stream for acquisition of framing, is an electronic one, readily performed with conventional digital circuitry.

In the illustration of FIG. 2, the first row of the block consists of "n" framing bits (F) of like value, in the example all "0's". This may be called the the Frame Alignment word. In addition, the first elements in the first column, except for the first element in the first row, are also framing bits, but of an inverted value in relation to the framing bits in the first row; F-bar or "1". In the last (nth) row both the first element and last element are framing bits of the value, F-bar or "1". In a matrix of 64 ($n^2$) elements, the framing or overhead elements (F and F-bar) total 16 (2n). They permit unambiguous usage of 48 user bits i.e. $n^2 - 2n$, where n=8) in the multiplex-demultiplex system.

The logic in support of the basic framing format, which lends itself to simplified execution, may be explained as follows. The serial data stream must be run in sequence through an AND gate and upon the occurrence of a succession of eight F bits or "0's", the frame alignment word is recognized. The arrangement will not malfunction in the addressing function by any unfavorable selection of values for the user bits. For instance, should all the user bits be assigned a value of zero, confusion will not occur with any of the subsequent rows because the first element in every row is a framing bit, F-bar having a value of 1, preventing confusion of any subsequent row with the first row.

A further possibility for confusion, which occurs at the end of the frame, is avoided by use of the terminal framing bit F-bar or "1". Assuming that the final user bits in the last row of the frame are "0's", the presence of the last framing bit F-bar or "1", terminates the "0" sequence, preventing some portion of the last row as appearing to be part of the frame alignment word.

Figure 3:
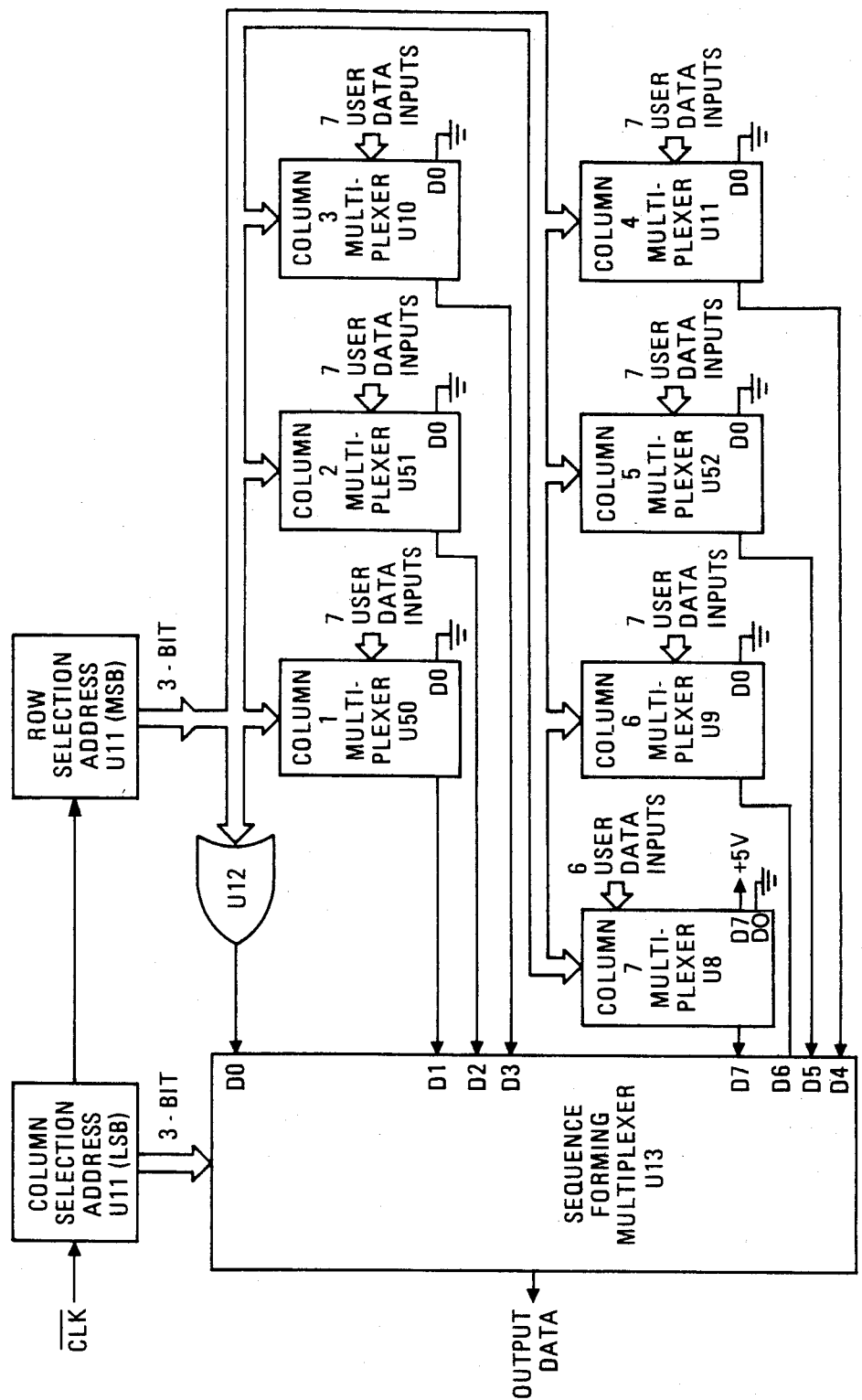
FIG. 3 is a simplified block diagram of a multiplexer designed to perform fast framing of data as it is being multiplexed prior to transmission over a communication link.

The multiplexing means to which the parallel data is applied for formatting into a serial sequence of $n^2$ bits is illustrated in FIG. 3. As previously explained, the bits are set to occur in successive clocking intervals, and the sequences formed from $n^2$ bits follow one another in successive clocking intervals, without exception.

The formatting is achieved by means of a first sequence forming multiplexer (U13), (n−1) n-bit column forming multiplexers (U50, U51, U10, U8, U9, U52 and U11), a first n state counter (U11) for column selection, a second n-state counter (U11) for row selection, counting at $1/n^{th}$ the counting rate of the first counter, and means (OR-gate U12) for establishing the inverted framing bit (F-bar) for the first column of the matrix.

The formatting of the user inputs into successive sequences of $n^2$ bits taking place as follows. As shown in FIG. 3, the parallel user data is coupled to the 6 times seven inputs illustrated for multiplexers U50, U51, U10, U11, U52, U9 and to the six inputs illustrated for multiplexer U8, whose $n^{th}$ input position is set to +5V (corresponding to F-bar). The values of the user data inputs may be refreshed in the conventional manner, preferrably under control of a system clock.

The formatting then takes place under the control of the column selection counter U11 (LSB) and the row selection counter U11 (MSB) the two counters being serially connected. The column selection count is coupled to the column selection address inputs of the sequence forming multiplexer UB, where the result is to successively sample each of the data inputs D0 to D7, at the clocking rate, and to couple the successive values available at these inputs to the UB outputs.

The D1 to D7 inputs of U13, are in turn coupled to the data output terminals of the seven column multiplexers, to each of which 7 (or 6) user data inputs are supplied. The counting rate of the column multiplexer is set by the row selection address counter U11 (MSB) which counts at $1/n^{th}$ the rate of the sequence forming multiplexer. Accordingly, the multiplexer 13, inputs one user data input (e.g. the first input) from each column multiplexer until all of the first inputs have been obtained, at the end of which the row selection address increments one bit, finishing the first subsequence. The second subsequence continues with the multiplexer U13 inputting one user data input (e.g. the second input) from each column multiplexer, until all of the second inputs have been obtained, at the end of which the row selection address changes one bit, finishing the second subsequence.

The presence of the OR-gate U12, which goes low when row selection returns to zero but remains high for all non-zero counts, insures that the first element of the D0 column has a value of "0", and that the succeeding elements of the D0 column have a value of "1". The initial framing bit (F) in the succeeding columns, (column 1 to column 7) is set in by grounding the D0 input of each column multiplexer. The final framing bit is achieved by setting the D7 input of the 7th column multiplexer to a logical high (F-bar).

Figure 4:
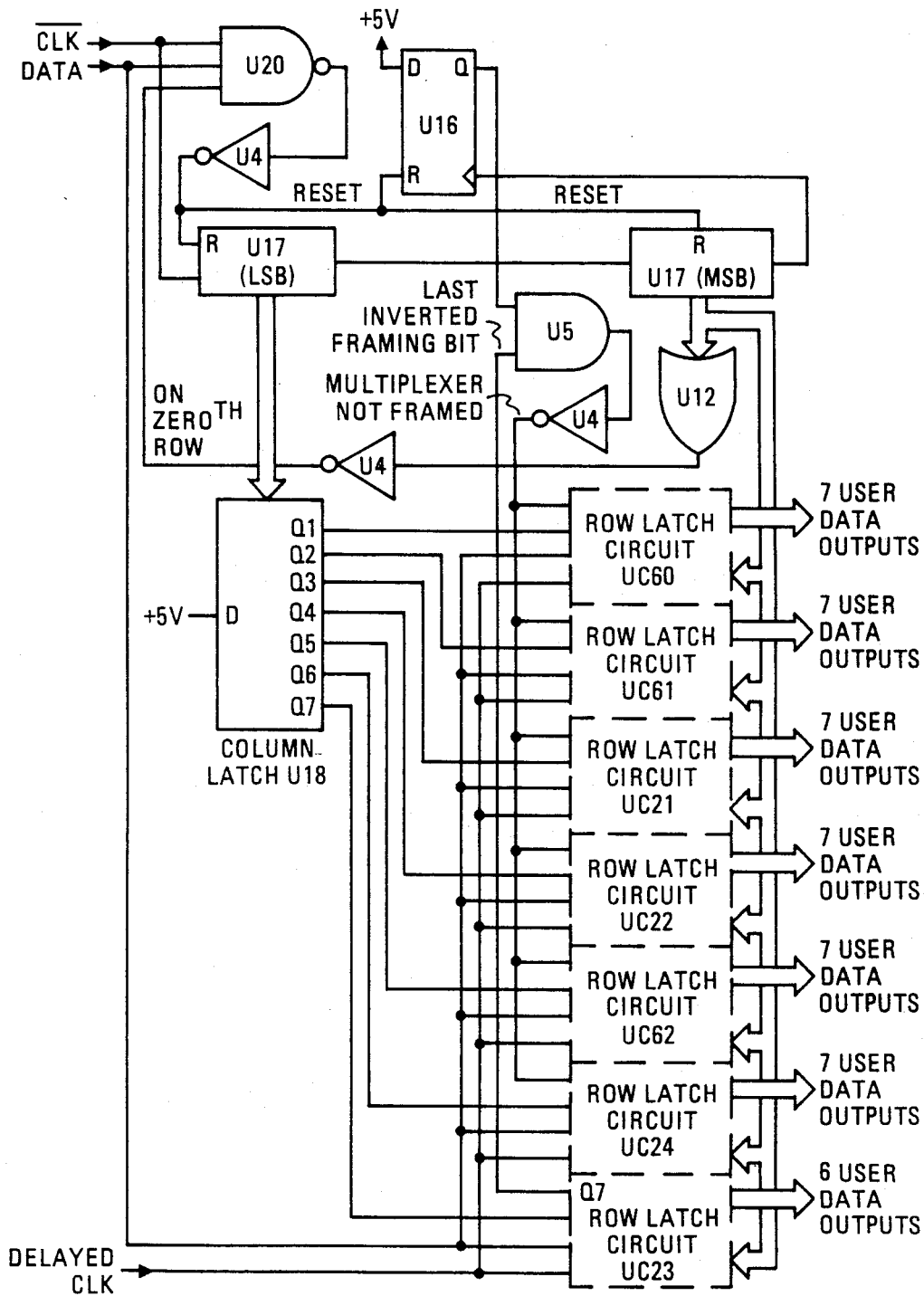
FIG. 4 is a simplified block diagram of a demultiplexer for demultiplexing (decoding) multiplexed data transmitted over a communications link in the fast framing format of the present invention.

The demultiplexing means to which the serial data in serial sequences of $n^2$ bits is applied for distribution to $(n^2-2n)$ user data outputs is illustrated in FIG. 4.

The demultiplexing means may be seen to comprise a column selection address latch (U18), (n−1) row selection address latch circuits, each of which has (n−1) addressable user data output latches, (UC60, UC61, UC21, UC22, UC62, UC24, UC23), a first clocked n-state counter (U17 LSB) for controlling the column selection address latch U10, a second clocked n-state counter (U17, MSB) for controlling the row selection address latch, and sundry gates, U5, U12, U16 and U20 and inverters U4 (3) which respond to the framing bits and control the demultiplexing function. More particularly, as shown in FIG. 5A the row selection address latch circuits (UC60, UC61, etc.) each consist of an addressable latch (IC) (e.g. U60), an OR-gate (e.g. U6) (except UC23, as shown in FIG. 5D) and a NAND gate (e.g. U19). The demultiplexing process is similar to the multiplexing process, with certain differences, which will be subsequently explained.

The means to distribute the serial data to the $(n^2-2n)$ user data outputs includes the column selection address latch (U18), the (n−1) row selection address latch circuits, the first counter U17 (LSB) and the second counter U17 (MSB). As in the multiplexing process, the column selection address latch has its three address inputs coupled to the output of the first counter U17 (LSB), which counts at a more rapid rate than the row selection addressable latches (U60, etc.). The row selection address latches have their three address inputs coupled to the second counter U17 (MSB) which counts at $1/n^{th}$ the rate of the LSB counter. In the demultiplexer, the data stream is connected to the D (data) input of each row selection address latch, and the column selection address latch U18 directs the distribution of data to the first user data output of each row selection latch (U60, etc.), until all seven have refreshed data. The process continues until all user data outputs $(n^2-2n)$ have been filled from the data inputs contained in the sequences of $n^2$ bits.

The manner in which the column selection address latch directs the distribution of data bits to the $n^2-2n$ user data outputs may be explained with reference to FIGS. 4 and 5A. The direction involves the reset signal from (U5−U4), delayed clock (CLK-90 degrees) and the select signal from U18 acting upon U19, U6 and U60 as in the row selection address latch circuits.

As seen in FIG. 4, the D input of the column latch U18 is set high, causing successive single outputs of U18 to go high at the counting rate of U17 (LSB). The data stream, however, is connected directly to the D inputs of the row selection address latch circuits, but it is only written into the user data outputs as permitted by the other inputs to the row latch circuits. When $Q_1$, $Q_2$ etc. outputs of U18 go high successively, one necessary, but not sufficient condition is fulfilled for writing the data to the respective user data outputs of the row latch circuit.

The output from U18, which is termed the "select" input, is coupled to one input of the NAND gate U19, as illustrated in FIG. 5A. The delayed clock (CLK-90 degrees) is coupled to the other input of the NAND gate U19. The output of the NAND gate U19 is coupled to one input of the OR-gate U6. The Master Reset from (U5−U4) depending in turn upon the inputs to U5 (which are related to framing) is coupled to the write disable (WD) input to the row latch U60 and to the other input of the OR-gate U6. The output of the OR-gate U6 is coupled to the reset input of the latch U60.

Figure 5C:
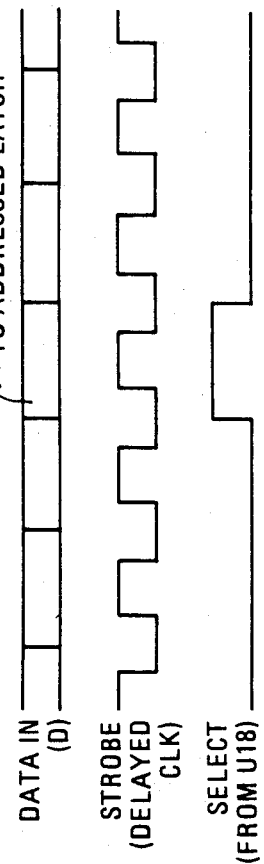
Figure 5A:
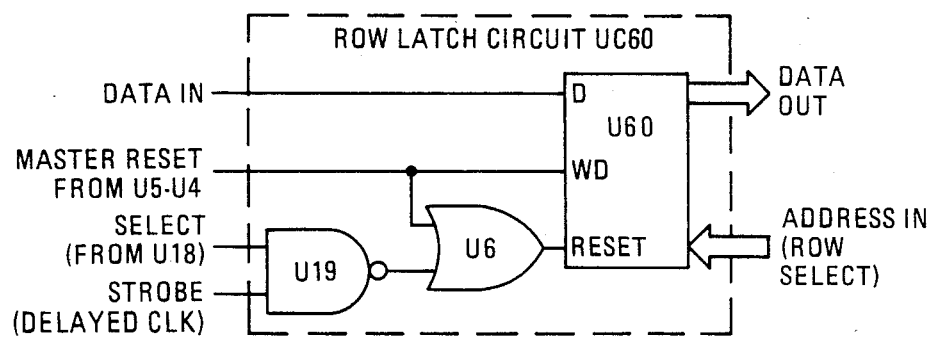
Figure 5D:
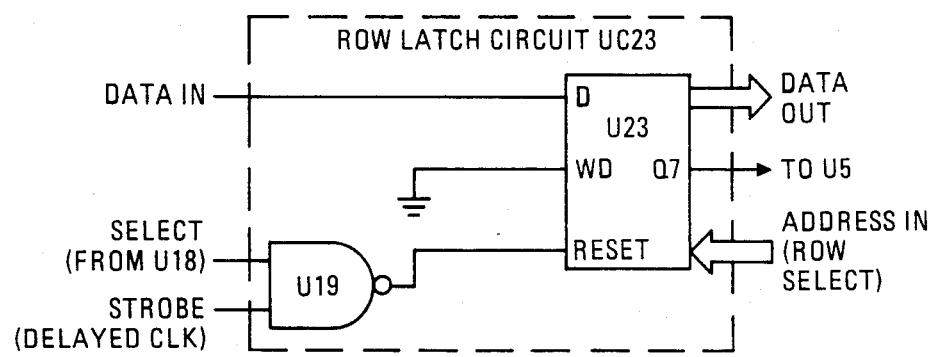

The truth table of the row selection address circuits is provided in FIG. 5B. When write disable (WD) and reset (R) are low ("0"), data is written to the addressed latch output. (There are no changes to the other 6 latches.) The writing instant is further illustrated in FIG. 5C with reference to the inputs to U19. In particular, the data available from the data stream is "strobed" by the delayed clock (CLK-90 degrees) which goes high in the center of the clocking interval that the select output from U18 is high. Thus the data bit is written to the addressed row latch outputs when the master reset is low and both "select" and "strobe" are high.

The synchronization of the count in the distribution of data to the $(n^2-2n)$ user data outputs entails the operation of the gates U5, U12, U20 and the three inverters (U4). The NAND gate U20 has its three inputs coupled respectively to the clock (CLK-bar), the data stream and via inverter U4 to the output of OR gate U12 (U12-U4 being an equivalent NOR gate). OR NOR gate U12-U4 has its three inputs coupled to the three outputs of the counter U17 (MSB). The output of NAND gate U20 is coupled to the inverter U4, making the U20-U4 combination an AND gate. The resulting AND gate is coupled to the reset input of the counters U17 (LSB) and U17 (MSB) and to the reset input of flipflop U16. The Q output of flipflop U16 is coupled to one input of AND gate U5 whose other input is coupled to the $Q_7$ output of U23 (the $n-1^{th}$ row selection address latch). The flipflop U16 is clocked by the final count of U17 (MSB). Finally the output of the NAND gate (U5-U4), which provides the master reset, is coupled to the reset inputs of all row selection address latches except latch U23, whose reset is set to "0".

The synchronization of the count in the distribution of data to the $(n^2-2n)$ user data outputs takes place in the following manner. The count starts, as earlier implied, with the row and column address counters reset to zero. This, assuming fault free operation, occurs as the data sequence consisting of n "0" (F framing) bits, passes into the multiplexer.

The output of NOR gate (U12-U4) to AND gate (U20-U4) goes high for the duration of the zero$^{th}$ row responsive to a completed count returning to a 000 state. The data input to AND gate (U20-U4) stays low through the zero$^{th}$ row, and the clock (CLK-bar) assumes a 0 and a "1" for half of each count. Thus AND gate (U20-U4) produces a "0" not allowing reset [of U17, (LSB) U17 (MSB) or U16] and the count of the counters continues in the normal manner.

If, however, a logic one is encountered in the data stream, while the row select address is in the 000 state, the AND gate (20-U4) will go high with the clock (CLK-bar) and the counters U17 LSB, U17 MSB, and flipflop U16 will be reset. U17 LSB, and U17 MSB stay reset to zero as do the corresponding latches (UC60-UC24), until a serial stream of eight consecutive zeros occurs in the data stream. After the eight consecutive zeros without "1's" are strobed, U17 (MSB) increments to 001, and the output of the NOR gate (U12-U4) goes low. Then the user data bit are sequentially loaded to the appropriate latch outputs.

The flipflop U16 in conjunction with the NAND gate (U5-U4) is used to provide a further indication as to whether the demultiplexer is properly framed or not. This is based on comparing the last framing bit, which should have the value of F-bar, with the value (F-bar) stored on flipflop 16.

As earlier noted, the output of the second counter (U17 MSB), the $n+1^{th}$ count, is coupled to the clock input of the flipflop U16. Assuming that a reset voltage is not present on the reset input to the flipflop, the clock input will propagate the D input, which is a logical high, to the Q output, making it also a logical high and of the same value as the inverted framing bit F-bar.

The reset voltage only occurs when an error is present in the frame acquisition word. Accordingly, after framing, Q16 normally remains high for the duration of the frame. The framing bit, which is the last bit in the last row should have the value of F-bar, as already noted, and it should appear at the last terminal (D7) of the last row latch circuit when the data is finally clocked to that address. Accordingly, the D7 output of the last latch and the Q output of U16, are both coupled to NAND gate U5-U4. Should the last bit not have the correct value (F-bar), the NAND gate will go high signalling a fault, and resetting each row selection address latch (except U23 whose reset does not entail U6). In addition, write disable is set to 1. The result is that the affected output data lines are returned to zero as indicated by the bottom row of the truth table for U60, and the counting must recommence.

What is claimed is:

1. In an arrangement for multiplexing synchronous digital input data available in a parallel format to a serial format for transmission over a communications channel and for demultiplexing the serial data at the output of the communications channel into the parallel format, the combination comprising A. $(n^2-2n)$ input terminals for synchronous parallel data to be multiplexed, where (n) is an integer, B. multiplexing means to which said parallel data is applied for formatting into a serial sequence of $(n^2)$ bits, said bits and sequences succeeding one another at regular clocking intervals, said multiplexing means comprising formatting means providing (n) like digital framing bits (F) forming a framing alignment word forming a first subsequence and defining the beginning of said sequence, said frame alignment word being followed by a second subsequence in which the first bit is an inverted framing bit (F-bar) followed by (n−1) bits of data, said second subsequence being followed by (n−3) successive subsequences, each initiated by an inverted framing bit (F-bar) followed by (n−1) bits of data, the last of said (n−3) subsequences being followed by an $(n^{th})$ subsequences initiated and terminated by inverted framing bits (F-bar) and including (n−2) bits of data between said inverted framing bits, and C. demultiplexing means, to which said serial data is applied, to distribute said serial data to data outputs, comprising means to distribute said data by means of a column selection address latch to (n−1) row selection address latches, each row selection address latch having (n−1) addresses, except for the last, which has (n−2), and means responsive to said framing bits to synchronize said latches to properly distribute said serial data to said data outputs, said combination provided for multiplexed transmission of $(n^2-2n)$ data bits, requiring (2n) bits for framing in a virtual matrix of (n) rows and (n) columns of bits and coupling data from said $(n^2-2n)$ input terminals without ambiguity to said $(n^2-2n)$ addresses for each sequence and repeating the distribution for each succeeding sequence.

2. The combination set forth in claim 1 wherein said multiplexing means comprises A. a sequence forming multiplexer having (n) data inputs, an output for the multiplexed sequence, and column selection address inputs B. an (n−1) fold plurality of n-bit column forming multiplexers, having row selection address inputs and having the initial input set to the value of the framing bit (F) and the subsequent bits supplied with data, the last of said plurality of n-bit column forming multiplexers having the last input set to the value of the inverse framing bit (F-bar)

C. a first clocked n-state counter whose count is coupled to said column selection address inputs of said sequence forming multiplexer to cause said sequence forming multiplexer to select data from each column multiplexer in sequence, D. a second clocked n-state counter, having row select address outputs coupled to said row selection address inputs of said column forming multiplexers for addressing said column multiplexers, serially coupled to said first counter for counting the more significant bits and thereby counting at a rate slower than said first counter by a factor n, and E. means, having its input coupled, to said row select address outputs of said second counter and having its output coupled to the first data input of said sequence forming multiplexer for establishing the framing bit (F) for the first element and the inverted framing bits (F-bar) for the remaining elements of the first column of said matrix, the second through $n^{th}$ bits (F) in the sequence forming the framing alignment word being generated by the initial input data setting on each of said column multiplexers; the first inverted framing bit of each subsequence being generated by said means (E), and the final framing bit of the sequence being generated by the setting of said last input of said last column multiplexer.

3. The combination set forth in claim 2 wherein the means of said demultiplexing means to distribute said serial data comprises A. a column selection address latch having n−1 outputs for enabling formation of the multiplexed sequence and a column selection address input B. an (n−1) fold plurality of n-bit row selection address latch circuits having data inputs from the multiplexed data stream and having row selection address inputs, C. a first clocked n-state counter, whose count is coupled to said column selection address input, to cause said column selection address latch circuit to write data to each row selection address latch circuit in sequence, and D. a second clocked n-state counter, serially coupled to said first counter and having row select address outputs coupled to said row selection address inputs, for counting the more significant bits and thereby counting at a rate slower than said first counter by a factor (n), for addressing said (n−1) row selection latch circuits.

4. The combination set forth in claim 3 wherein the means of said demultiplexing means for detecting said frame alignment word further comprises a first gate, having an input coupled to said row select address outputs of said second counter to indicate when the row select address is on the first row, to initiate resetting the addresses of both counters to zero in the case of an invalid frame alignment word, a second gate having an input coupled from the output of said first gate and an input from the multiplexed data stream, which produces an output when there is an output from the first gate and when the mulitplexed data has the value of F-bar, the output of said second gate thereupon setting both counters to zero in the case of an invalid frame alignment word.

5. The combination set forth in claim 4 wherein
said second counter produces an output pulse signaling the ($n^{th}$) count and a return to zero, said combination further comprising a flipflop producing a logical state having the value of F-bar upon completion of the row count, which is sustained in the absence of a fault in the frame alignment word but reset to the value of F in the presence of a fault in the frame alignment word, and a NAND gate having one input coupled to the last output of the last row selection address latch circuit and to which the last framing bit, having a value F-bar, is addressed, and the other input coupled to the output of said flipflop, the output of the NAND gate, in the event that the last bit fails to have the value F-bar, resetting all the row latches except for the last to zero and thereby setting the corresponding user data outputs to zero.

* * * * *